Aug. 31, 1954
L. E. HECKATHORN ET AL
2,687,680
GROUND SUPPORTED IMPLEMENT AND HITCH THEREFOR
Filed Jan. 2, 1948
5 Sheets-Sheet 1
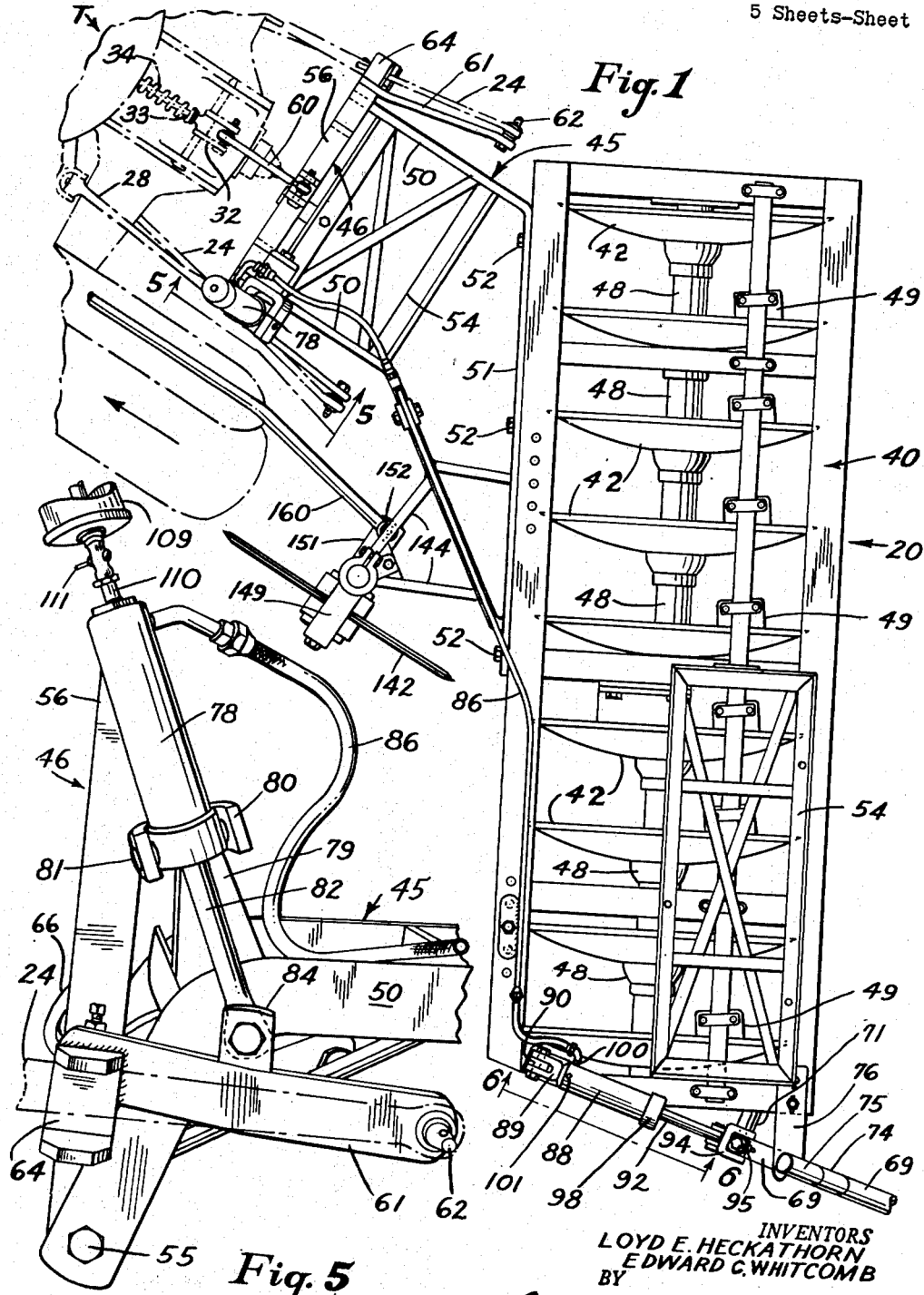
INVENTORS
LOYD E. HECKATHORN
EDWARD C. WHITCOMB
BY
Carlson, Pitzner, Hubbard & Wolfe
ATTORNEYS Aug. 31, 1954
L. E. HECKATHORN ET AL
2,687,680
GROUND SUPPORTED IMPLEMENT AND HITCH THEREFOR
Filed Jan. 2, 1948
5 Sheets-Sheet 2
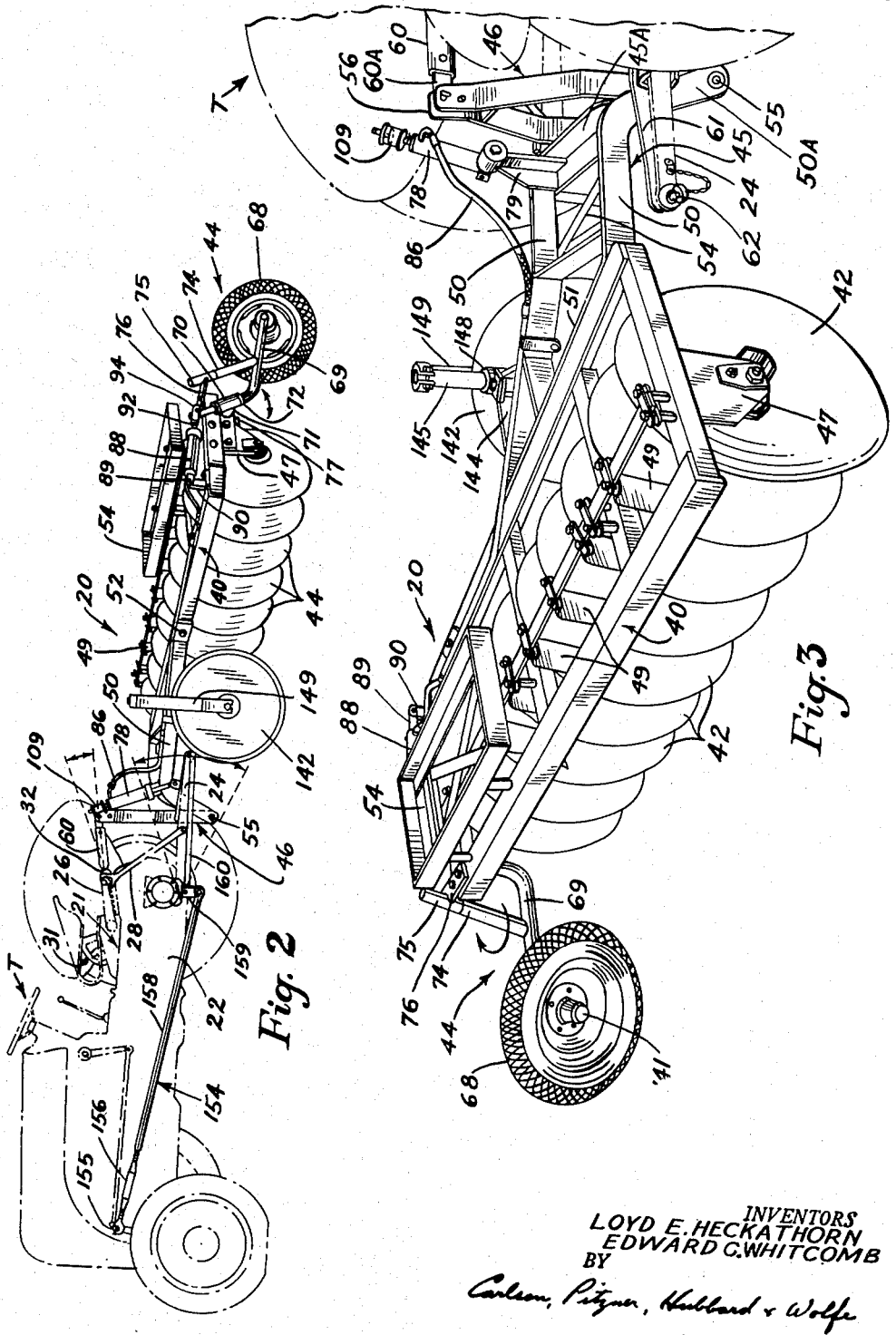
INVENTORS
LOYD E. HECKATHORN
EDWARD C. WHITCOMB
BY
*Carlson, Pitzner, Hubbard & Wolfe*
ATTORNEYS

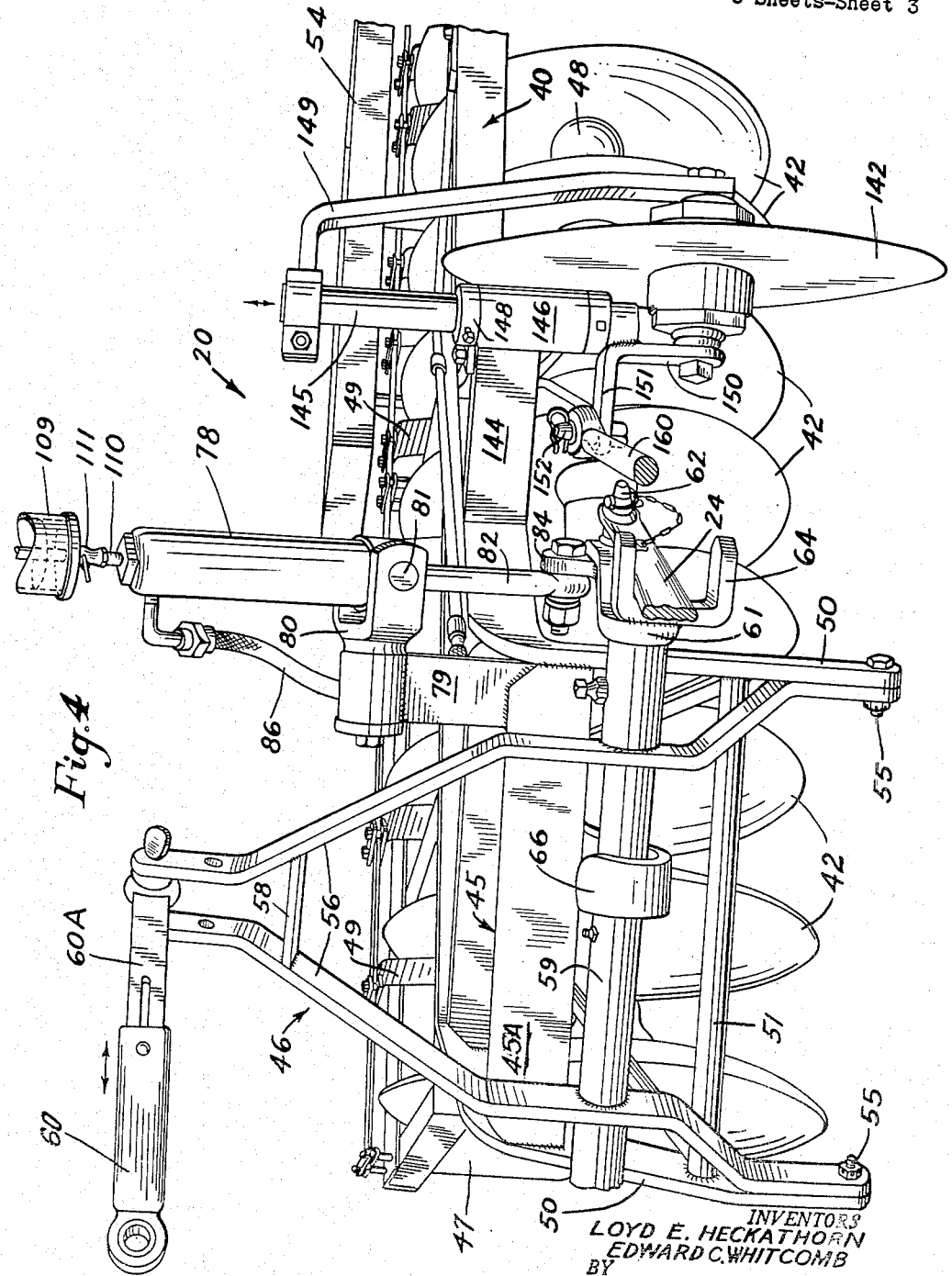

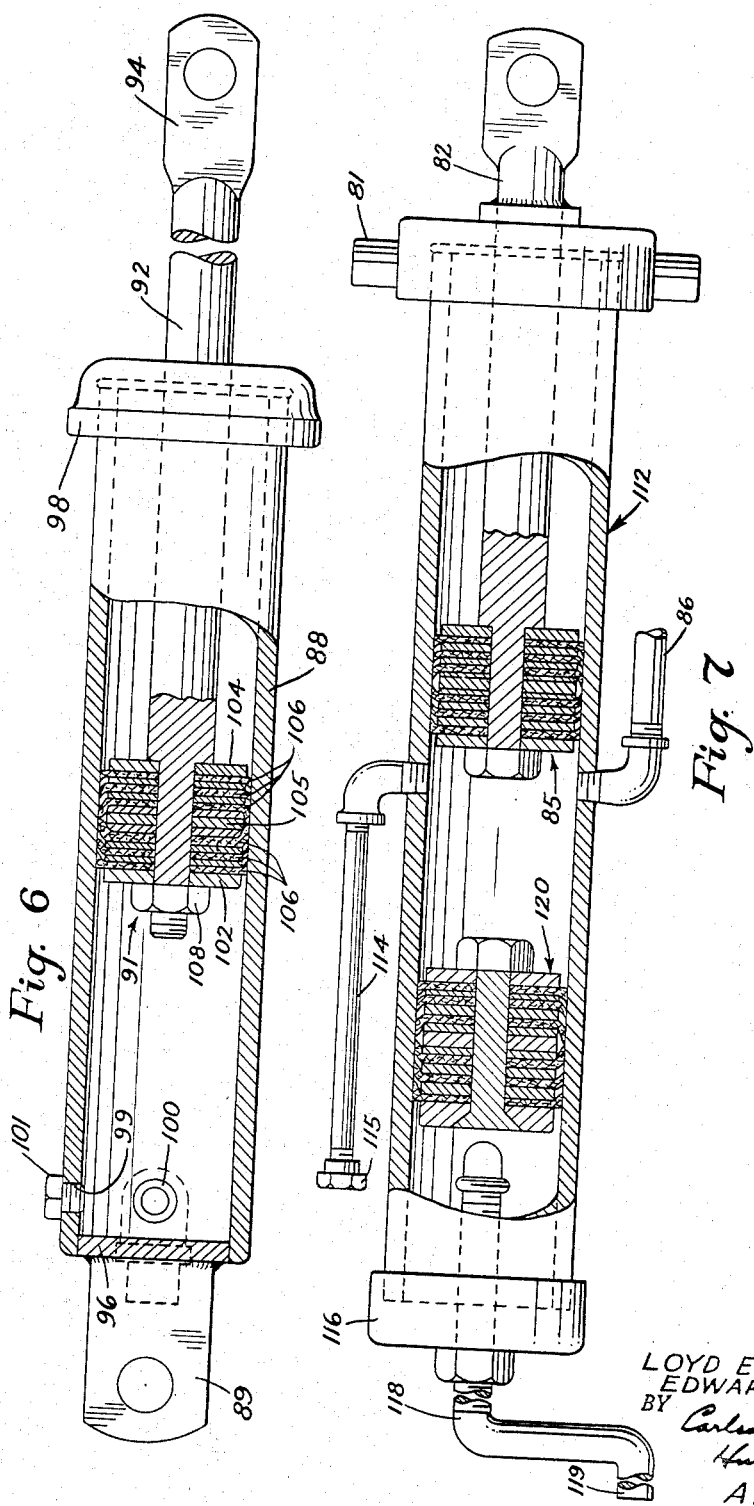

Aug. 31, 1954

L. E. HECKATHORN ET AL 2,687,680

GROUND SUPPORTED IMPLEMENT AND HITCH THEREFOR

Filed Jan. 2, 1948

INVENTORS
LOYD E. HECKATHORN
EDWARD C. WHITCOMB
BY

ATTORNEYS

Patented Aug. 31, 1954

2,687,680

UNITED STATES PATENT OFFICE 2,687,680

GROUND SUPPORTED IMPLEMENT AND HITCH THEREFOR

Loyd E. Heckathorn, Garden Grove, and Edward C. Whitcomb, Santa Ana, Calif., assignors to Howard B. Rapp, Jessica M. Rapp, George A. Sattler, Marie A. Sattler, Basil R. Twist, Mifflin K. Thomas, and Howard B. Rapp, Jr., copartners, doing business as Towner Manufacturing Company, Santa Ana, Calif.

Application January 2, 1948, Serial No. 16

17 Claims. (Cl. 97—46.07)

The present invention relates generally to tractor drawn implements and hitch mechanisms for them. More particularly, it has to do with ground supported implements and hitches of a class applicable to tractors having power lift devices, such, for example, as that shown in Henry George Ferguson Patent No. 2,118,180 issued on May 24, 1938.

One of the objects of the invention is to provide an implement adapted to be trailingly connected to a tractor and having an independent hydraulic system thereon responsive to relative movement between the draft member of the implement and the hitch linkage of the tractor for vertically positioning such implement with respect to the ground.

Another object is to provide an implement having a leading end adapted for detachable connection to the draft linkage of a tractor and susceptible of direct vertical movement therewith, such implement including an independent hydraulic linkage for automatically reflecting in the trailing end of the former the vertical movements of its leading end.

A further object is to provide an implement of the character set forth and having an independent hydraulic system with appropriate adjusting means for leveling the frame of the implement to compensate for various operating conditions.

Another object is to provide an implement of the type set forth and having novel means for counteracting any unbalanced lateral thrust produced by the reaction of the ground upon the earth-working portion of such implement.

Still another object is to provide means for considerably increasing the scope of usefulness of an implement having inherent side thrust by permitting the same to be turned upon a reasonable radius to either the right or left.

Further objects and advantages will become apparent as the following description proceeds, taken in connection with the accompanying drawings, wherein:

Figure 1 is a fragmentary plan view of an illustrative implement embodying a preferred form of the invention.

Fig. 2 is a side perspective view of the implement shown in Fig. 1 with one of the rear wheels of the tractor removed to permit a clearer showing of the hitch linkage.

Fig. 3 is a rear perspective view of the implement illustrated in Fig. 1.

Fig. 4 is an enlarged fragmentary front perspective view of the implement shown in Fig. 1.

Fig. 5 is a fragmentary perspective view of the hitch assembly and draft member of the implement of Fig. 1, taken with the plane of the line 5—5 as a reference.

Fig. 6 is an enlarged longitudinal sectional view through the slave cylinder of the hydraulic system of the implement and taken in a plane parallel to the line 6—6 in Fig. 1.

Fig. 7 is an enlarged longitudinal sectional view through a modified form of master cylinder.

Figure 8:
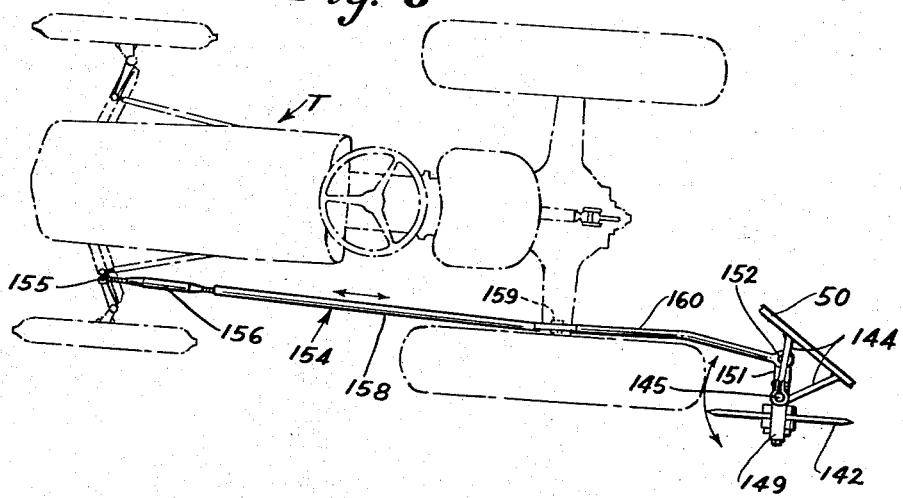
Figs. 8 and 9 are plan and elevational views respectively of the steered coulter per se, together with its supporting bracket and operating mechanism.

While the invention is susceptible of various modifications and alternative constructions, certain illustrative embodiments have been shown in the drawings and will be herein described in some detail, but it is to be understood that there is no intention to limit the invention to the specific forms disclosed, the intention being, on the contrary, to cover all modifications and alternative constructions falling within the spirit and scope of the invention as expressed in the appended claims.

Referring more specifically to the drawings, a preferred embodiment of the invention is there shown in the form of a ground supported implement 20 known variously as a disc tiller, one-way disc, or Wheatland plow. As illustrated, the implement is detachably coupled in trailing relationship to the rearward portion of a light tractor T for haulage hereby, the tractor having an automatic draft control in the form of a load-responsive power lift such as that disclosed in Patent No. 2,118,180 referred to above. The power lift arrangement construction shown in such patent has been selected merely for purposes of illustration, the invention being particularly but not exclusively applicable to tractors equipped therewith. Briefly, an arrangement of this character comprises a power lift device 21 rigidly mounted on the tractor T and having force applying means in the form of a one-way hydraulic ram or actuator housed within the tractor frame 22 and not shown in the drawings. The power lift 21 is operately connected to a pair of forwardly converging lower draft links 24 by means of a pair of crank arms 26 universally connected at their rearward extremities to a pair of drop links 28. The lower draft links 24 are trailingly attached to the tractor T as by universal pivots (not shown) located on the rear axle housing at points below and slightly forward of the center line thereof, such mounting permitting considerable vertical swinging movement of the links 24.

The admission and discharge of pressure fluid to and from the actuator of the power lift is regulated by a slidable control valve (not shown) enclosed within the tractor frame 22 and having three positions, namely, neutral, supply, and exhaust. When this valve is in the neutral position, the flow of fluid into the actuator or out of the same is precluded. When the valve is in the supply position, pressure fluid is admitted to the actuator and serves to move the piston thereof in an outward direction. Such outward motion of the piston is transmitted by the crank arms 26 and drop links 28 to the lower draft links 24, swinging the latter upwardly about their pivot points on the rear end of the tractor. On the other hand, when the main valve is in the exhaust position, fluid is bled from the actuator, permitting the piston to move in an inward direction and allowing the crank arms, drop links, and lower draft links 24 to swing downwardly under the action of gravity.

The draft links may be caused to move vertically between their upper and lower extreme positions by means of a manual control or quadrant lever 31. This is normally accomplished by mounting the lever 31 in such a manner that its inner end will shift an appropriate control member located within the internal mechanism of the power lift 21 and thereby alter the position of the control valve. Thus, when the quadrant lever 31 is pushed down toward the lower extremity of its travel, the control valve is shifted into an exhaust position causing fluid to be bled from the power lift actuator. Conversely, when the quadrant lever is pulled toward its upper extremity of travel, the resulting shift of the internal control member moves the control valve into the supply position, admitting pressure fluid to the actuator and causing the piston thereof to move outwardly as mentioned above. When the actuator piston reaches the limit of its outward travel, an abutment thereon causes the control valve to be restored to its neutral position, trapping the fluid in the actuator behind the piston.

The power lift 21 also includes means for automatically shifting the control valve in response to changes in the draft load of an implement coupled to the lower draft links 24, the latter being raised upon an increase in draft load and lowered upon a decrease therein. In the present instance, this is accomplished by the use of a stress-responsive control element comprising a shackle 32 rockably mounted on the tractor at a point above and rearward of the center line of the rear axle housing, together with an axially movable control rod 33 and a biasing spring 34 for opposing movement of the control rod inwardly, Fig. 1. The inner end of the control rod 33, by reason of a connection with the internal control member of the power lift 21, is arranged to position the control valve of the latter. Upon the application to the shackle 32 of a stress in excess of that determined by the setting of the quadrant lever 31, the consequent shifting of the control valve will cause the power lift 21 to raise the lower draft links 24 whereby to lift the implement and cause a diminution of opposing draft force until the stress imposed on the shackle 32 and the force of the biasing spring 34 again balance the control valve at its neutral position. By the same token, should the stress at the shackle decrease to a value below that determined by the quadrant lever setting, the links 24 will accordingly be lowered.

Organization of implement

Turning now to Figs. 1 to 3, it will be observed that the implement 20 is organized upon a main frame 40 of appropriate structural members secured together as a rigid assembly. Operatively associated with the frame 40 is suitable earth working means which in this instance comprises a gang of discs 42. The implement is equipped adjacent its trailing end with an adjustable ground supporting means 44 for raising and lowering the rearward end of the frame 40. Projecting forwardly from the latter is a draft member 45 in the form of a sub-frame which carries a hitch frame 46 to permit the implement to be detachably coupled to the automatic draft control system of the tractor.

Preferred embodiment—General

The main frame 40 is provided with a pair of spaced-apart depending end hangers 47 between which are supported the ground-engaging discs 42. These discs are separated from each other by a plurality of interposed spacers 48 and, as clearly shown in Fig. 1, are journaled upon an axis which is skewed with respect to the line of draft. In order to remove clods of soil from the discs 42 and thus keep the same in free rotating condition, an individually adjustable scraper 49 is associated with each disc.

For the purpose of applying draft force to the implement 20 at an angle other than 90 degrees to the common axis of the discs 42, the draft member 45 comprises an assembly of rigid structural members including a pair of spaced-apart parallel arms 50 of unequal length. Adjacent their forward ends, the arms 50 terminate in downwardly extending portions 50A (see Fig. 3) having alined transverse holes therein for receiving the attaching means for the hitch frame. Rearwardly, the arms 50 are connected together by a skewed transverse bar 51 unitary with one of them and joined rigidly to the other as by welding. The member 45 may be attached to the main frame 43 by clamping the transverse bar thereto as by means of assembly bolts 52.

In order to increase the bite of the implement into the soil and also to obtain proper weight distribution therein, weight boxes 54 may be used. In the case at hand, one such box is mounted in the vicinity of the rearward portion of the frame 40, while another is built into the draft member or sub-frame 45.

Pivotally attached as at 55 to the depending ends of the arms 50 is the hitch frame 46. This structure may conveniently be fashioned as an A-frame having a pair of spaced-apart, upwardly extending arms 56 (refer to Fig. 4) connected together intermediate their ends by means of a reinforcing strut 58 and a rock tube 59, the upper ends of the arms 56 converging to receive thereinbetween a shortened link 60A which is actually a component of a two part compression link 60. The tube 59 is rockably supported on a shaft (not shown) concentric therewith and which is secured between the front ends of a pair of rearwardly extending arms 61. The latter are provided at their rearward ends with holes for receiving laterally extending attaching pins 62 which connect the arms 61 with the trailing ends of the lower draft links 24 of the tractor. Unitary with the forward ends of the arms 61 and projecting outwardly therefrom in a lateral direction are a pair of U-shaped brackets 64 each of which is adapted to straddle a respective one of the lower links 24 and thereby preclude all but negligible relative rocking movement between the latter and the arms 61. By the use of this arrangement, the arms 61 may be detachably connected to the draft links 24 for direct swinging movement therewith. In order to prevent the A-frame 46 from falling forward when the implement is in an uncoupled condition, a strap hook 66, or its equivalent, may be mounted on the draft member 45 for engagement with the rock tube 59 to serve as a forward movement limiting stop.

The adjustable ground supporting means 44 for the implement 20 comprises a pneumatic tired ground wheel 68 which is journaled on the depending end of a bent crank 69, both the crank and the wheel being mounted for bodily swivel movement on the main frame 40 of the implement. The upper portion of the crank arm 69 is rotatably housed within a swivel fitting 70 (Fig. 2), permitting the arm 69 and the wheel 68 to swing caster-like about a generally upright axis. The fitting 70 is formed with a laterally extending tubular bearing 71 journaled for movement about a substantially horizontal axis on an outwardly extending stub shaft (not shown) fixed on the implement frame. The arm 69 is retained within the fitting 70 by the use of a pair of rigidly attached, spaced-apart collars 72 which prevent relative axial movement between these parts. In the present instance there is mounted intermediate the ends of the lower leg of the crank arm 69 an upstanding stem 74 having adjacent its upper end a hardened wear sleeve 75. Projecting outwardly from the frame 40 and susceptible of engagement by the sleeve 75 is an adjustable mechanical stop 76 which serves to limit the caster-like movement of the ground wheel assembly toward the implement. Also projecting outwardly from the frame 40 and into the path of the swivel fitting 70 is another mechanical stop 77, the latter precluding excessive forward swing of the ground wheel assembly during backing of the implement. With the construction described a force applied to the arm 69 so as to move the wheel 68 toward the implement 20 tends to raise the rearward portion of the same with respect to the ground. Conversely, a force applied to the crank arm 69 in the opposite direction will tend to lower the rearward portion of the implement with respect to the ground.

Hydraulic system of implement

As already explained, the draft load of the implement 20 is transmitted to the tractor through the lower draft links 24 and the compression link 60, the connection in this instance being through the rockably mounted A-frame 46 and the arms 61. By reason of such arrangement, the corrective action initiated by the power lift 21 in automatically regulating the draft load produces relative movement between the connecting linkage of the tractor and the implement frame 40. However, relative movement of the same nature also occurs between the draft member 45 and the arms 61 which are detachable with the implement. Since the arms 61 when the implement is hitched are constrained by the pins 62 and the brackets 64 to move with the lower draft links 24, it has been found convenient to utilize this latter relative movement for actuating an independent auxiliary hydraulic system carried entirely by the implement 20.

Referring in particular to Figs. 1, 2, 4, and 5, it will be noted that a master actuator or ram 78 is mounted upon the draft member 45 as by means of an upstanding bracket 79 and a reinforcing cross-angle 45A carried by the member 45. At its upper end, the bracket 79 is provided with a rockably mounted yoke 80. The latter, being swivelly connected to the actuator 78 as by trunnions 81 in addition to its rockable connection with the bracket 79, comprises a universal mounting for the actuator. Projecting downwardly and arranged for sliding movement with respect to the master actuator is a piston rod 82, the lower end of which is pivotally coupled to an upstanding lug 84 unitary with one of the arms 61. As a result of such construction, it will be appreciated that the relative movement mentioned earlier between the draft member 45 and the arms 61 incident to the vertical swinging movement of the draft links 24 produces corresponding relative movement between the piston rod 82 and the cylinder of the master actuator 78. The rod 82, is of course, provided with a piston 85 (Fig. 7) slidably housed within the actuator and adapted either to force fluid therefrom or to draw fluid thereinto depending upon the direction in which the piston rod is moved.

Mounted on the main frame 40 in the vicinity of its rearward portion and connected to the master actuator 78 by means of a flexible hydraulic conduit 86, is a second or slave actuator 88 (see Figs. 1 and 2). The forward end of this actuator is formed with a yoke 89 which is pivotally supported by an upstanding lug 90 unitary with the frame 40. Like the master actuator 78, the slave is provided with a piston 91, Fig. 6, and a piston rod 92, the free end of the latter terminating in a yoke shaped fitting or clevis 94. The latter is connected to the upper portion of the bent crank arm 69 by means of a universal joint 95. Thus the slave actuator 88 is arranged to operate the adjustable ground supporting means 44 of the implement, and to do so in accordance with the movements of the master actuator 78.

In producing the foregoing hydraulic system, it is possible to employ an exceedingly simple and inexpensive construction in both the master and the slave actuators. Since such units differ only in certain external fittings, a description of the internal details of one will suffice for both. Taking as an example the slave actuator 88 shown in Fig. 6, it will be noted that the cylinder portion thereof merely comprises a section of tubing having a closed end cap 96 mounted at one end and an apertured cap 98 at the opposite end for slidably receiving the piston rod 92. Adjacent its closed end, the actuator is formed with two tapped holes 99 and 100 through its side wall, the hole 99 receiving a bleeding plug 101 and the hole 100 receiving an end fitting of the hydraulic conduit 86. Mounted adjacent the end of the piston rod 92 and on a necked-down portion of the same is the piston assembly 91. In the present instance, such assembly comprises a pair of rigid end washers 102 and 104, together with a rigid central washer 105. Sandwiched between the rigid washers and having marginal peripheral portions projecting beyond the same are a plurality of resilient washers or packing rings 106 which are adapted to sealingly engage the inner side walls of the actuator cylinder. The entire assembly is pressed together and maintained as a unitary structure by means of a nut 108 threaded on the end of the piston rod 92.

With the independent hydraulic apparatus arranged as described, the implement can be controlled with nicety and exactitude. For each increment of vertical movement of the hitch links 24 an equal increment of vertical movement is imparted to the forward end of the implement frame. Simultaneously a proportional increment of motion is imparted to the piston of the master ram 78. This is reflected as an equal movement in the slave actuator 88. By properly dimensioning the crank 69 which mounts the ground wheel 68, the increments of adjusting movement imparted to the latter wheel by the slave actuator can be made to result in vertical adjustment movements of the rear end of the frame equalling those for the front end. At least substantial equality of movement can be maintained throughout that portion of the ground wheel's range of movement which may be aptly termed its "working range." By "working range" is meant the range of ground wheel movement from the lowermost position for the discs to one in which the discs just barely touch the ground or are raised only a short distance above it. In other words, substantially equal raising and lowering of the front and rear ends of the frame is accomplished throughout the working range of the implement. As the implement is elevated still further, beyond the working range as for transport purposes, there is somewhat less of proportionality. The increment of movement for the rear end gradually decrease in respect to the rise of the front end. But since this takes place outside the working range there is no loss in precision of actual working operation for the implement.

Occasion may and frequently roes arise for adjusting the attitude or posture of the implement relative to the ground, particularly in leveling it. For example, in opening the land the tractor runs along level. But on the next round of the field the right tractor wheel runs in the furrow, dropping the front end of the frame. Accordingly, the rear end of the implement must be lowered if the frame is to be brought level again for this new condition.

Provision has been made for accomplishing such adjustment simply and expeditiously, and moreover, while still keeping the apparatus operating within the working range referred to above. That is to say, such adjustment is made without interference with the equality of front and rear end vertical movement previously noted, and also without sacrifice in the length of the range of adjustment in which such equality is retained. The newly established attitude of the implement is thus accurately retained throughout changes in working depth for the discs that may be effected by either manually or automatically controlled changes in elevation of the draft links 24.

In the preferred attitude adjustment mechanism shown (Figs. 1 to 4) the master actuator 78 is equipped at its upper end with a fluid reservoir 109. The latter communicates with the actuator cylinder through a short tube 110 having a pet-cock 111 interposed in it. Desirably the reservoir 109 is made of transparent plastic so that the volume of oil in it can readily be observed. Normally this reservoir contains a relatively small quantity of fluid in excess of that which is necessary to fill completely the auxiliary hydraulic system consisting of master and slave cylinders with their interconnecting conduit 86.

It will be found expedient initially to fill the above system with oil or other hydraulic fluid when the implement is in its lowermost position with respect to the ground. Under such circumstances, the ground wheel 68 is at its extreme position of rearward movement and the piston 91 of the slave actuator is consequently at the inner end of its stroke, a point at which the cylinder volume is a minimum. Conversely, the piston 85 of the master actuator 78 is at the outer end of its stroke, where the cylinder volume is a maximum. With the plug 101 removed from the slave actuator 88 long enough to bleed the air thereform, the system may be filled by injecting oil into the master cylinder by way of the reservoir 109 and the pet-cock 111. Upon completion of the filling operation and after the pet-cock 111 has been closed, the piston of the slave actuator is conditioned to move through a stroke equal in length to that of the master actuator 78. This will place the system in the transport condition wherein a full stroke of the master actuator piston will permit the ground wheel 68 to swing from its extreme rearward position to an extreme forward position located close to the rearward end of the frame 40, the crank arm 69 in such position being almost but not quite in contact with the stop 77 which projects into its path.

With the auxiliary hydraulic system thus filled with oil and thereby conditioned for a full stroke of the slave actuator, the implement can readily be raised to full transport position. In such case the implement is raised high enough for safe transport along the highway.

Having been conveyed to the point of use the implement may, for example, be employed in opening the land. In such case the main hydraulic system on the tractor is used to lower the draft links 24 and thus bring the implement down to a desired working depth for the discs. The draft load which is to be maintained automatically is preset by the position of the quadrant lever on the tractor in the usual manner. With the tractor running level in opening the land the implement will normally be in a proper horizontal attitude with the auxiliary hydraulic system full of oil.

After the land has been opened on an initial round, however, the right rear wheel of the tractor will on the next round be located in the previously opened furrow. As a consequence, the front end of the implement is dropped down and the implement frame must be leveled again. For that purpose the operator has only to open the pet-cock 111 and permit some of the fluid to enter the reservoir 109 from the master actuator. This shortens the total possible stroke of the slave actuator with respect to the master actuator producing the effect of shifting the ground wheel 68 rearwardly of the implement and thereby lowering the rear end of the implement frame to the desired level attitude. The pet-cock 111 is, of course, reclosed as soon as the desired position of the implement is attained.

Normally, even after a leveling adjustment the slave actuator will retain a sufficiently long effective stroke to raise the implement to a height sufficient for transport in the field and even for short distances along the highway. In other words, the implement can still be raised sufficiently for some small clearance of the discs from the ground. It is particularly to be noted that the portion of the slave actuator stroke which is cut off is that final portion which as previously noted results in a ground wheel movement whose vertical component is not strictly proportional to vertical movement of the draft links 24. What was previously referred to as the working range of ground wheel adjustment is still retained unimpaired. Accordingly, raising and lowering of the draft links 24 will result in raising and lowering of the implement while still retaining its newly assumed attitude or level position. Restoration of fluid from the reservoir 109 to the auxiliary system to refill the latter for transport purposes or the like is a simple matter. The operator has only to drop the draft links 24 and open the pet-cock 111. Dropping the draft links pulls the piston of the master actuator 78 to the full end of its stroke, thereby tending to draw a vacuum in the system. Consequently, when the pet-cock 111 is opened the vacuum will cause a return of the fluid from the reservoir to refill the system.

For certain types of service, it might be found advantageous to provide a modified master actuator having its own self-contained fluid reservoir. Turning to Fig. 7, such an actuator 112 is there shown having the familiar piston rod, piston, and trunnion mounting of the master actuator 78 described above. Since the cylinder body of the actuator 112 is somewhat elongated and of substantially greater length than that of the actuator 78, the conduit 86 is connected to the actuator 112 near its midpoint. Opposite the point of entry of the conduit 86, a filler conduit 114 is mounted in a tapped hole in the actuator cylinder wall, running longitudinally thereof and terminating in a small filler cap 115. The upper end of the actuator (the end away from the trunnion mounting) is closed by a cap 116 which carries a threaded adjusting stem 118 having a handle 119 for moving the latter axially of the cap. Mounted inside the actuator between the end of the stem 118 and the main piston 85 is a free piston 120 which is structurally similar to the piston 85. In effect, the free piston 120 comprises a movable abutment within the actuator cylinder for varying the enclosed cylinder volume between the two pistons to increase or decrease the oil capacity of the system and thereby provide an expedient for leveling the implement as desired.

*Operation of implement hydraulic system*

While the operation of the system just described will undoubtedly be clear to one skilled in the art, a brief summary at this point might be appropriate. Assuming the implement 20 to be in an uncoupled state, the same may be hitched to the tractor T merely by backing the latter up to the implement so that the lower draft links 24 straddle the draft member 45 and the hitch frame 46. The lower draft links are then brought into engagement with the brackets 64 and the attachment pins 62 are inserted through the aligned holes in the trailing ends of the draft links 24 and the arms 61. The compression link 60 is then pinned to the shackle 32, thereby completing the hitching operation. Since the system, as already indicated, is carried entirely by the implement, the necessity for making or breaking hydraulic connections when hitching or unhitching the former is completely eliminated.

Assuming that the hydraulic system of the implement has been filled with oil or other suitable fluid, the quadrant lever 31 on the tractor is then set for the draft load to be automatically maintained thereon. As the implement is drawn by the tractor, a stress or force component of the draft load is applied to the automatic control of the power lift 21. Since the ground resistance and consequently the draft load varies with the depth of earth penetration of the earth-working portion of the implement, the power lift responds to such variation by initiating corrective movement of the hitch linkage in the proper sense to restore the earth-working portion to a depth at which the ground resistance remains constant. This response by the power lift causes the lower draft links 24 to position vertically and by direct movement the forward end of the implement frame. Simultaneously, the relative movement between one of the arms 61 (both of such arms being constrained to move with the draft links 24) and the implement draft member 45 serves to actuate the auxiliary hydraulic system, causing the same to apply a proportional movement to the crank arm 69 and in a proper direction to position vertically the rearward end of the implement 40 so as to maintain the frame thereof level. The net result of this action is automatic regulation of the draft load on the tractor with the frame of the implement maintained in a substantially constant attitude with reference to the ground. Where working conditions are such as to cause tilt in the frame, the same may readily be leveled by adjusting the hydraulic system in the manner already discussed.

*Thrust counteracting means*

Provision has been made in the exemplary implement 20 for offsetting the inherent lateral thrust which arises as an incident to the engagement of the discs 42 with the ground. As indicated in Figs. 2 and 3, this is accomplished in part by mounting the ground wheel 68 for rotation in a plane which is inclined toward the implement. In the present instance, the arm 69 is formed with a transversely extending lower end portion 141 which slopes downwardly from the horizontal plane, the wheel 68 being journaled on such portion. With this arrangement, the wheel engages the land side rather than the bottom of the furrow made by the rearmost one of the discs 42. Consequently, the ground reaction against the wheel 68 has a lateral component which tends to oppose the lateral thrust of the implement.

Under working conditions not involving sharp or frequent turns, the furrow wheel 68 alone might be sufficient to counteract the lateral thrust of the implement. Due to the flexible nature of the auxiliary hydraulic system, the thrust resisting action of the wheel 68 will normally remain uninterrupted even when the discs cross a narrow ridge or a gulley. In the case of a ridge, for example, the discs will tend to rise as they encounter it and their weight will be momentarily removed from the ground wheel 68. Due to its own weight, however, the wheel will drop down and follow the furrow, thus continuing to resist the thrust of the implement. By reason of the positive connection between the piston of the slave actuator 88 and the crank arm 69 of the ground wheel, a temporary vacuum will be created in the hydraulic system when the wheel 68 drops away from the implement. Such vacuum will be immediately and automatically filled, however, as soon as the wheel climbs out of the ditch and again assumes its share of the implement's weight. On the other hand, if a narrow gulley should be encountered by the implement, the furrow wheel will support the latter as the discs cross, whereupon it will drop down and function as in the case of crossing a ridge.

Figure 9:
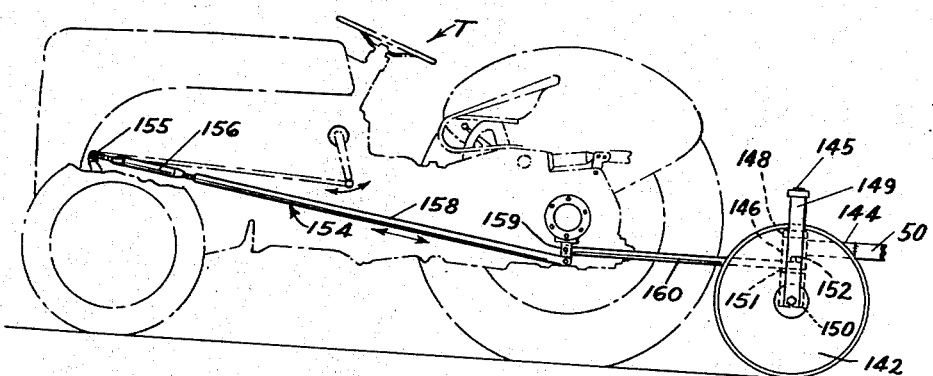

In order to cope with more adverse working conditions and to realize the full benefits of precision control from the auxiliary hydraulic system, it may be found advisable to employ additional means for counteracting the inherent side thrust of the implement and increasing the lateral stability of the latter. Referring generally to Figs. 1, 2, and 4, and more specifically to Figs. 8 and 9, it will be noted that such means comprises a rolling coulter 142 mounted near the forward end of the implement and carried by a bracket 144 extending outwardly from the draft member or sub-frame 45. With the advancement of the implement in response to the draft of the tractor, the coulter 142 bites substantially into the soil. The ground reaction set up against the outer face of the coulter and which results from the lateral thrust of the implement creates considerable opposition to such thrust.

Normally, a disc tiller or other ground-working implement having inherent side thrust is unsuited for contour plowing, and as a matter of fact, for anything more complicated than straight plowing with turns in one direction only. With an implement of this type and having an angle other than 90 degrees (such as that shown in Fig. 1), between the axis of the earth-working means (which in the present instance comprises the discs 42) and the line of draft, it is a comparatively simple matter to make a turn of relatively short radius away from such axis. By the same token, it is virtually impossible to make a turn of comparable radius toward this axis, due principally to the fact that on such a turn the motion of the implement has a large component running parallel to the axis of the earth-working means and which is opposed by a correspondingly large ground reaction on such means. Consequently, even on a turn (in the present instance a right turn) having a sufficiently large radius to permit the implement to overcome the axial ground reaction, there is a definite tendency for the implement to turn considerably wider than the tractor.

In order to improve the maneuverability of an implement having inherent side thrust by eliminating the foregoing difficulties, an additional feature may be incorporated into its construction. It has been found that the coulter 142, when operatively connected to the steering mechanism of the tractor, can be utilized to offset the large ground reaction running axially of the earth-working means when a turn toward the axis thereof is made. This result is obtained as a consequence of the turning of the coulter 142 and which is accompanied by a ground reaction in opposition to the heretofore unbalanced side thrust of the implement. Accordingly, in the implement 20 a vertically disposed stub shaft 145 is journaled in a bearing 146 carried by the bracket 144, the shaft 145 being retained therein against axial movement as by means of a pair of collars 148. Rigidly connected to the upper and lower extremities respectively of the shaft 145 are upper and lower brackets 149 and 150 having depending parallel end portions between which the coulter 142 is journaled. Projecting in a radial direction from the shaft 145 is an arm 151 unitary with the lower bracket 150 and which in the embodiment illustrated serves as a steering bar for the coulter 142. The arm 151 is provided adjacent its outer end with an upstanding pin 152 for pivotal engagement with an appropriate mechanical linkage 154 (Figs. 2, 8, and 9) which is tied to the steering mechanism of the tractor. In the present instance, such linkage may comprise a swivel fitting 155 which is unitary with an adjusting turnbuckle 156, the latter being connected to a rearwardly extending rod 158. The rearward end of the rod 158 is arranged to oscillate a depending lever 159 carried by the tractor frame, the lever being in turn pivotally connected to the pin 152 of the coulter assembly through a link 160.

By the use of the foregoing construction, each steering movement of the front wheels of the tractor is reproduced in the coulter 142 at the forward end of the implement. The implement 20 is constrained to follow closely the movements of the tractor at all times, traveling approximately along the center line of the tractor path even on the sharpest of turns and regardless of whether such turns are to the right or to the left.

The structure described also includes means for obtaining a certain amount of angular bias or offset of the coulter in order to strike a balance between the lateral forces acting on the implement. This can readily be done by a simple adjustment of the turnbuckle 156 so as to shorten or lengthen the overall dimension of the coulter steering linkage 154.

We claim as our invention:

1. In a ground supported implement for operative connection with a tractor having a draft link trailingly pivoted on its rear end portion for vertical movement by a power lift device on the tractor, the combination of a main frame having one end portion adapted for detachable connection to said draft link to be supported thereby and have relative motion in opposite directions with respect thereto upon raising and lowering movements of the link, said draft link being adapted to raise and lower said forward end portion of said main frame in accordance with the vertical movements of the power lift, an adjustable ground wheel assembly attached to said frame and having a ground wheel depending therefrom, said assembly including said wheel being disposed on said frame at a location remote from said one end portion, said ground wheel thus serving to support said assembly and the contiguous portion of said frame, a hydraulic slave actuator associated with said assembly for effecting adjustments thereof to vary the vertical position of said ground wheel relative to said contiguous portion of said frame, a hydraulic master actuator having moving parts adapted to be interconnected between said one end portion of said frame and the draft link, conduit means interconnecting said master actuator and said slave actuator so as to form an integrated hydraulic system, said master actuator being arranged to discharge fluid into said slave actuator and to withdraw fluid from said slave actuator upon relative movement of said frame end portion and the draft link in opposite directions, said hydraulic system thus serving to automatically adjust the vertical position of said ground wheel relative to said frame proportionately to changes in the vertical position of said one end portion of said frame.

2. In a ground supported implement for a tractor having a draft link trailingly pivoted on the rear end portion thereof and including a power lift device having an automatic control for effecting raising and lowering of said draft link by said device in accordance with variation in a force applied to said control, such force being proportional to the draft load on the tractor, the combination of an implement frame having a draft member, a hitch assembly adapted to be connected to the draft link of said tractor to have movement relative to said implement frame incident to vertical swinging movement of said draft link, said draft member adapted for pivotal connection to said hitch assembly and for relative movement with respect thereto, vertically adjustable ground supporting means on said implement frame, and an integrated hydraulic system carried by said implement, said system including a slave actuator operatively connected to said ground supporting means and a master actuator carried by said implement frame and adapted to be connected to said hitch assembly, said system being operable to adjust said ground supporting means vertically in response to the relative movement between said draft link and said draft member incident to the operation of said automatic control for maintaining a constant draft load on the tractor.

3. A ground supported implement for a tractor having a pair of laterally spaced-apart draft links trailingly pivoted on the rear end portion thereof and a power lift device for effecting raising and lowering of said draft links in accordance with variations in a force applied to an automatic control on said power lift device, said force being a component of the draft load on the tractor, said implement comprising the combination of a main frame having a draft member, a hitch assembly adapted to be connected to the laterally spaced-apart draft links of said tractor to be drawn thereby and for vertical movement therewith, vertical movement of said draft links producing relative movement between the portion of said main frame adjacent the tractor and the tractor, said draft member adapted for pivotal connection to said hitch assembly and for relative movement with respect thereto, an earth-working member dependably mounted on said main frame, a ground wheel assembly carried by said main frame for adjustably supporting the same, and a closed hydraulic adjusting system also carried by said main frame and having a slave actuator operatively connected to said ground wheel assembly, a master actuator on said frame having certain working elements adapted to be interconnected with said hitch assembly, conduit means interconnecting said actuators to enable said master actuator to transfer quantities of fluid into and out of said slave actuator for adjusting said ground wheel assembly in response to the relative movement between said main frame and said tractor, the adjustment of said main frame by said ground wheel assembly serving to vary the depth of earth penetration of said earth-working member and thus maintain constant the draft load on the tractor.

4. In a ground supported implement for a tractor having a pair of laterally spaced-apart draft links trailingly pivoted on its rear end portion and a power lift for effecting raising and lowering of said links in accordance with variations in a force applied to an automatic control on said power lift, said force being proportional to the draft load on the tractor, the combination comprising a main frame adapted to support an earth-working member thereon, a rockable ground wheel assembly for adjustably supporting said main frame, a draft member rigidly attached to said main frame, a hitch assembly pivotally mounted on said draft member and including a pair of rearwardly extending arms adapted to be rigidly attached to said draft links for direct swinging movement therewith and for relative movement with respect to said draft member, and an integrated adjusting system for said ground wheel assembly including a slave actuator associated with said assembly and operatively connected to a master actuator, said master actuator being operatively connected between one of said arms and said draft member for actuating said slave actuator to adjust said ground wheel assembly in response to the relative movement between said hitch assembly and said draft links incident to the raising and lowering of said links, the adjustment of said ground wheel assembly serving to vary the depth of earth penetration of the earth-working member carried by said frame and thus maintain constant the draft load on the tractor.

5. In a ground supported implement for use with a tractor having a power lift and an automatic control therefor of substantially the form shown in U. S. Patent No. 2,118,180, said tractor also having a pair of laterally spaced draft links trailingly pivoted on the rear end portion thereof for vertical swinging movement by said power lift in accordance with variations in a force applied to said automatic control, said force being proportional to the draft load on the tractor, the combination comprising a main frame, a ground wheel assembly rockably mounted thereon, an earth-working member dependably mounted on said main frame, a draft member also mounted on said main frame, a hitch assembly rockably mounted on said draft member and including a pair of rearwardly extending arms adapted to be rigidly coupled to said draft links for direct swinging movement therewith and for relative movements with respect to said draft member, a master hydraulic actuator interconnected between said draft member and one of said rearwardly extending arms for admitting fluid into and for expelling fluid from itself under increased pressures in response to said relative movements, a hydraulic conduit, a slave hydraulic actuator connected to said master actuator via said conduit and interconnected between said main frame and said ground wheel assembly, said slave actuator being operable in response to the entrance of fluid from and to the return of fluid to said master actuator to adjust said main frame vertically by rocking said ground wheel assembly, the vertical adjustment of said main frame serving to vary the resistance of the ground against said earth-working member and thereby maintain substantially constant the draft load on the tractor.

6. In a ground supported disc harrow for use with a tractor having a power lift and an automatic control therefor of substantially the form shown in U. S. Patent No. 2,118,180, said tractor also having a pair of laterally spaced draft links trailingly pivoted on the rear end portion thereof for vertical swinging movement by said power lift in accordance with variations in a force applied to said automatic control, said force being proportional to the draft load on the tractor, the combination comprising a main frame, a vertically adjustable ground wheel assembly mounted thereon, a draft member also mounted on said main frame, a hitch assembly rockably mounted on said draft member and including a pair of rearwardly extending arms adapted to be rigidly coupled to said draft links for direct swinging movement therewith and for relative movement with respect to said draft member, a master hydraulic actuator pivoted for two-way swivel movement on said draft member and having a piston and a piston rod pivotally attached to one of said rearwardly extending arms, said piston rod and piston being reciprocable in response to said relative movement between said draft member and said one arm, a slave hydraulic actuator pivotally mounted on said main frame and having a piston and a piston rod, the latter being connected by means of a universal coupling to said ground wheel assembly, a hydraulic conduit interconnected between said master and said slave actuators and forming with said actuators an integrated hydraulic system, said slave actuator being adapted to adjust said ground wheel assembly vertically in response to the transfer of quantities of fluid between said slave actuator and said master actuator, said hydraulic system thus adjusting said main frame vertically and in proportion to the relative movement between said forwardly extending arms and said draft member.

7. In a ground supported implement for a tractor having a draft link trailingly pivoted on its rear end portion for bodily raising and lowering by means of a power lift, the combination of an implement frame having a draft member, a draft link of said tractor to have movement relative to said implement frame incident to vertical movement of said draft link, said draft member adapted for pivotal connection to said hitch assembly and for relative movement with respect thereto, support means for said implement including an adjustable ground supporting assembly, a hydraulic system responsive to vertical movement of said draft link for adjusting said ground supporting assembly of said implement, said system comprising a master actuator mounted on said implement and having working parts adapted to be interconnected with the tractor, a slave actuator also mounted on said implement and arranged to operate said adjustable ground supporting assembly, a hydraulic conduit connecting said master and said slave actuators and permitting the former to control the movements of the latter, and means for selectively increasing or decreasing the amount of fluid in said hydraulic system to adjust the posture of said implement with respect to the ground.

8. In a ground supported implement for a tractor having a pair of laterally spaced-apart draft links trailingly pivoted on its rear end portion and a power lift having an automatic control for actuating the same and thereby effecting bodily raising and lowering of said draft links in accordance with variations in draft load on the tractor, said implement having an adjustable ground supporting assembly presenting a downwardly extending ground engaging member, a closed hydraulic system responsive to the actuation of said power lift for adjusting said ground supporting assembly to maintain a constant draft load on the tractor and comprising, in combination, a master actuator mounted on said implement, a slave actuator also mounted on said implement and operatively connected to said adjustable ground supporting means for effective adjustment thereof, a hydraulic conduit connecting said master and said slave actuators and permitting the former to transfer quantities of fluid into and out of the latter to control the movements of the latter, and a fluid reservoir arranged for selective communication with said master actuator to increase or decrease the amount of fluid in said closed system and thereby to adjust the angle between said implement and the ground.

9. In a ground supported implement adapted for detachable connection to a tractor having a pair of laterally spaced-apart draft links trailingly pivoted on its rear end portion and a power lift for raising and lowering said links together with an adjacent connected end portion of said implement, the combination of supporting means including a ground wheel for adjustably supporting the end portion of said implement remote from said connected end portion, a hydraulic system carried by said implement and having a first unit associated with said support means and a second unit carried by said implement and adapted to be mechanically interconnected with said tractor, said system being responsive to the actuation of said power lift for proportionately adjusting said ground wheel, and means connected with said hydraulic system for selectively increasing or decreasing the extent of such proportional adjustment.

10. In a ground supported implement adapted for detachable connection to a tractor having a pair of laterally spaced-apart draft links trailingly pivoted on its rear end portion and a powingly pivoted on its rear end portion and a power lift for raising and lowering said links together with an adjacent connected end portion of said implement, the combination of adjustable support means including a ground wheel for supporting the end portion of said implement opposite said connected end portion, a hitch element adapted to be connected with at least one of said links to have movement relative to said implement as an incident to vertical swinging movement of said links, a closed hydraulic system carried by said implement for adjusting said support means, said system including a master hydraulic actuator mounted on said implement and connected to said hitch element, a slave actuator also mounted on said implement and hydraulically connected with said master actuator, said slave actuator being adapted to adjust said ground wheel through a given range of movement in response to the movements of said master actuator, and means including a hydraulic member for varying the quantity of fluid in said system and thereby selecting the range of movement through which said ground wheel may be adjusted.

11. In a ground supported implement for operative connection with a tractor having a draft link trailingly attached to its rear end portion for vertical swinging movement by a power lift device on the tractor, the combination of a main frame having a leading end constructed and arranged to be detachably connected to the draft link, said leading frame end being adapted to be supported by said link so as to be raised and lowered in accordance with vertical movements of the link effected by the power lift, said leading frame end and the link having relative movement between each other upon vertical movement of the frame end and link, an adjustable wheel assembly secured to the trailing end of said frame and presenting a downwardly extending ground wheel, a hydraulic slave actuator associated with said wheel assembly for adjusting said assembly to vary the vertical position of said wheel relative to said trailing frame end, a master hydraulic actuator having a first part connected to said leading frame end and a second part adapted to be connected to the draft link, and conduit means interconnecting said master and slave actuators so as to form a closed hydraulic system, said master actuator serving to discharge fluid into and withdraw fluid from said slave actuator in response to relative movements of said leading frame end and the draft link incident to upward and downward movements of said leading frame end, said hydraulic system including said slave actuator thus effecting adjustment of said wheel assembly to vary the height of said trailing frame end proportionately to variations in the height of said leading frame end.

12. In combination with a tractor having a pair of pivoted draft links trailingly mounted thereon and a power lift device for raising and lowering said draft links, an implement including a main frame, a hitch element connected to one of said draft links for movement relative to said main frame as an incident to vertical swinging movement of said links, said main frame having one portion thereof pivotally connected to said hitch element for raising and lowering movement therewith, a vertically adjustable ground wheel assembly movably mounted on said frame, a hydraulic slave actuator connected to said assembly for effecting vertical adjustment thereof, and a hydraulic master actuator hydraulically connected to said slave actuator and mechanically connected between said frame and said hitch element for hydraulically energizing said slave actuator as an incident to vertical movement of said draft links.

13. For use with a tractor having a pivoted draft link trailingly mounted thereon and a power lift for swinging the draft link vertically, an implement comprising, in combination, an implement frame, a hitch element adapted to be connected to said draft link for movement relative to said implement frame as an incident to vertical swinging movement of said draft link, said implement frame having one end fashioned to be pivotally connected to said hitch element, an adjustable wheel assembly secured to said implement frame and including a ground wheel, a hydraulic slave actuator connected with said wheel assembly for effecting vertical adjustment of said wheel, a hydraulic master actuator mechanically connected between said implement frame and said hitch element and hydraulically connected to said slave actuator, said master actuator including an elongated cylinder and a first piston therein movable as an incident to relative movement of said implement frame and said hitch element to draw fluid into said cylinder and to discharge fluid therefrom to said slave actuator and a second adjusting piston within said cylinder, and manually operable actuating means on said cylinder engageable with said second piston to move the latter along the cylinder for discharging fluid therefrom into said slave actuator to make an independent adjustment of said ground wheel assembly.

14. For use with a tractor having a pivoted draft link trailingly mounted thereon and a power lift for swinging the draft link vertically, an implement comprising, in combination, an implement frame, a hitch element adapted to be connected to said draft link for movement relative to said implement frame as an incident to vertical swinging movement of said draft link, said implement frame having one end fashioned to be pivotally connected to said hitch element, an adjustable wheel assembly secured to said implement frame and including a ground wheel, a hydraulic slave actuator connected with said wheel assembly, a hydraulic master actuator mechanically connected between said implement frame and said hitch element and hydraulically connected to said slave actuator to form therewith a hydraulic system for vertically moving said wheel as an incident to relative movement of said frame and said hitch element, and implement leveling means correlated with said hydraulic system for independently adjusting the vertical position of said ground wheel through the intermedium of said slave actuator.

15. For use with a tractor having a rearwardly extending draft link pivotally mounted thereon and a power lift for raising and lowering the link, an implement for attachment to the tractor and comprising, in combination, an implement frame, a hitch element adapted to be connected to said draft link for movement relative to said implement frame as an incident to vertical swinging movement of said draft link, said implement frame having a portion thereof adapted to be connected to the hitch element, a movable working element mounted on said frame, a hydraulic slave actuator connected to said working element, a master actuator hydraulically connected with said slave actuator and mechanically connected between said implement frame and said hitch element, said master actuator serving to charge fluid into and withdraw fluid from said slave actuator to reversely move said working element as an incident to reverse vertical movement of the draft link and the attached portion of said implement frame.

16. In combination with a tractor having a pivoted draft link extending rearwardly thereof and a power lift for swinging said draft link vertically, an implement having an implement frame, a hitch element adapted to be connected to said draft link for movement relative to said implement frame as an incident to vertical swinging movement of said draft link, said implement frame adapted to be connected to said hitch element for vertical movement therewith, a movable working element mounted on said implement frame, a hydraulic slave actuator operatively connected to said working element, a master actuator hydraulically connected with said slave actuator and mechanically interconnected between said implement frame and said tractor, said master actuator serving to energize said slave actuator to actuate said working element as an incident to vertical movement of said implement frame by said draft link.

17. For use with a tractor including a pivoted draft link extending rearwardly thereof and a power lift for swinging said link vertically, an implement for attachment to the tractor and comprising, in combination, a frame having one portion thereof fashioned for interconnection with the tractor link for vertical movement therewith, a movable working element mounted on said frame, a hydraulic slave actuator operatively connected to said working element, a master actuator hydraulically connected to said slave actuator and supported on said frame, said master actuator being fashioned for mechanical interconnection with the tractor and serving to hydraulically energize said slave actuator to actuate said working element as an incident to vertical movement of said frame by the tractor link.

References Cited in the file of this patent

UNITED STATES PATENTS

| Number | Name | Date |
|---|---|---|
| 1,323,887 | McKay | Dec. 2, 1919 |
| 1,409,712 | Hansmann | Mar. 14, 1922 |

(Other references on following page)

UNITED STATES PATENTS

| Number | Name | Date |
|---|---|---|
| 1,702,615 | Paul | Feb. 19, 1929 |
| 2,225,253 | Beyer | Dec. 17, 1940 |
| 2,239,029 | Barrett | Apr. 22, 1941 |
| 2,243,989 | Strandlund | June 3, 1941 |
| 2,307,980 | Avrett, Jr. | Jan. 12, 1943 |
| 2,322,342 | Bunn | June 22, 1943 |
| 2,361,326 | Silver | Oct. 24, 1944 |
| 2,386,378 | Wippel | Oct. 9, 1945 |
| 2,397,270 | Kelly | Mar. 26, 1946 |
| 2,410,918 | Acton | Nov. 12, 1946 |
| 2,410,978 | Kelly | Nov. 12, 1946 |
| 2,414,114 | Martin | Jan. 14, 1947 |
| 2,427,669 | Gladden | Sept. 23, 1947 |
| 2,445,260 | Brimhall | July 13, 1948 |